United States Patent [19]

Inoue

[11] Patent Number: 5,071,225
[45] Date of Patent: Dec. 10, 1991

[54] BEAM SPLITTER FOR PRODUCING A PLURALITY OF SPLITTED LIGHT BEAMS FOR EACH OF WAVELENGTH COMPONENTS OF AN INCIDENT LIGHT BEAM

[75] Inventor: Teiji Inoue, Yamanashi, Japan

[73] Assignees: Hoya Corporation, Tokyo; Dainippon Screen Mfg. Co., Ltd., Kyoto, both of Japan

[21] Appl. No.: 635,767

[22] Filed: Dec. 28, 1990

[30] Foreign Application Priority Data

Dec. 29, 1989 [JP] Japan ............................. 63-342437

[51] Int. Cl.$^5$ .......................... G02B 27/14; G02B 5/28
[52] U.S. Cl. ..................................... 359/634; 359/589
[58] Field of Search ................. 350/171, 169, 166, 173

[56] References Cited

U.S. PATENT DOCUMENTS

| | | | |
|---|---|---|---|
| 4,125,864 | 11/1978 | Aughton | 350/286 |
| 4,693,544 | 9/1987 | Yamasaki et al. | 350/171 |
| 4,765,715 | 8/1988 | Matsudaira et al. | 350/171 |
| 4,797,696 | 1/1989 | Allen et al. | 350/171 |
| 4,870,268 | 9/1989 | Vincent et al. | 350/166 |

*Primary Examiner*—Jon W. Henry
*Attorney, Agent, or Firm*—Ladas & Parry

[57] ABSTRACT

In a beam splitter for producing splitted light beams for each of first and second wavelength components of an incident light beam, first and second transparent blocks have first outgoing and second incident planar surfaces, respectively, which are bonded by an intermediate transparent layer with a band-pass layer and first and second subsidiary reflection layers interposed between the intermediate layer and the second incident planar surface and with the surfaces kept in parallel. Antireflection and primary reflection layers are formed on a first incident planar surface of the first transparent block that is parallel to the first outgoing surface. First and second semitransparent layers are formed on a second outgoing planar surface of the second transparent block that is parallel to the second incident planar surface. The incident light beam is directed from the antireflection layer towards the band-pass layer. The band-pass layer passes, towards the first semitransparent layer, a first outgoing light beam having the first wavelength component and reflects, towards the primary reflection layer, a second outgoing light beam having the second wavelength component to make the primary reflection layer reflect the second outgoing light beam towards the second semitransparent layer through the intermediate layer between the subsidiary reflection layers. In cooperation with the first and the second subsidiary reflection layers, the first and the second semitransparent layers produce the splitted light beams for the first and the second wavelength components, respectively.

10 Claims, 4 Drawing Sheets

BEAM SPLITTER FOR PRODUCING A PLURALITY OF SPLITTED LIGHT BEAMS FOR EACH OF WAVELENGTH COMPONENTS OF AN INCIDENT LIGHT BEAM

BACKGROUND OF THE INVENTION

This invention relates to a beam splitter supplied with a single incident light beam having first second, and other wavelength components for splitting the incident light beam into first and second outgoing light beams having the first and the second wavelength components, respectively, and for splitting each of the first and the second outgoing beams into a plurality of partial light beams which may be called splitted light beams.

In Japanese Patent Publication No. 40,321/1978, a beam splitter is disclosed by Hashimoto et al. The Hashimoto et al beam splitter comprises a transparent block having first and second planar surfaces substantially parallel to each other. The first planar surface has an incident area and a remaining area. The second planar surface has a first exit area and another remaining area. The incident area is for receiving the incident light beam to direct the incident beam towards the first exit area.

A first band-pass layer has a band-pass filter characteristic and is formed on the first exit area. Supplied with the incident light beam, the first band-pass layer passes the first outgoing light beam and reflects the incident light beam except the first outgoing light beam towards the remaining area of the first planar surface. The remaining area of the first planar surface serves as a second exit area.

A second band-pass layer has another band-pass filter characteristic and is formed on the second exit area. Supplied with the incident light beam except the first outgoing light beam, the second band-pass layer passes the second outgoing light beam and reflects the incident light beam except the first and the second outgoing light beams towards the remaining area of the second planar surface. A different band-pass layer may be formed on the remaining area of the second planar surface for obtaining a different outgoing light beam having a different wavelength component.

However, Hashimoto et al never disclose that each of the first and the second outgoing light beams is furthermore splitted into a plurality of the partial or splitted light beams, each of which has the same wavelength component as the outgoing light beam in question has.

In U.S. Pat. No. 4,125,864 issued to John E. Aughton, another beam splitter is disclosed which splits a single incident light beam into a plurality of partial light beams, each of which has the same wavelength component as the incident light beam has. Merely for brevity of description, it will be assumed that the number of the partial light beams is two and that the partial light beams are called first and second partial light beams. The Aughton beam splitter comprises another transparent block having incident and outgoing planar surfaces substantially parallel to each other. The incident planar surface has an incident area and a reflection area on which a reflection layer is formed. The outgoing planar surface has first and second exit areas on which first and second semitransparent layers are formed, respectively.

The incident area receives the incident light beam and directs the incident beam towards the first semitransparent layer. Supplied with the incident light beam, the first semitransparent layer partially passes the incident light beams as the first partial light beam and partially reflects the incident light beam towards the reflection layer to make the reflection layer reflect the incident light beam towards the second semitransparent layer. Supplied with the incident light beam, the second semitransparent layer partially passes the incident light beam as the second partial light beam and partially reflects the incident light beam towards the reflection layer. Thus, the Aughton beam splitter splits the incident light beam into a plurality of the partial light beams which have the same wavelength component as the incident light beam has.

However, Aughton never teaches that the incident light beam has a plurality of wavelength components, such as first and second wavelength components, and that the incident light beam is splitted into a plurality of outgoing light beams which have the wavelength components, namely, the first and the second wavelength components, respectively.

An improved beam splitter is required which can produce a plurality of splitted light beams for each of wavelength components of an incident light beam and which can convert the incident light beam into the splitted light beams without a large optical energy loss.

SUMMARY OF THE INVENTION

It is therefore an object of this invention to provide a beam splitter which can produce a plurality of partial or splitted light beams for each of a plurality of wavelength components of an incident light beam.

It is another object of this invention to provide a beam splitter of the type described, which can convert the incident light beam into the splitted light beams with a decreased optical energy loss.

It si still another object of this invention to provide a beam splitter of the type described, which has a small size.

Other objects of this invention will become clear as the description proceeds.

A beam splitter to which this invention is applicable is supplied with a single incident light beam having first and second wavelength components for splitting the incident light beam into first and second outgoing light beams having the first and the second wavelength components, respectively, and for splitting each of the first and the second outgoing light beams into a plurality of partial light beams.

According to this invention, the beam splitter comprises: a first transparent block having first incident and first outgoing planar surfaces substantially parallel to each other, the first incident planar surface having a primary incident area and a primary reflection area, the primary incident area being for receiving the incident light beam to direct the incident light beam towards the first outgoing planar surface; a primary reflection layer formed on the primary reflection area; a second transparent block having second incident and second outgoing planar surfaces substantially parallel to each other, the second incident planar surface having a subsidiary incident area, first and second subsidiary reflection areas, and a remaining area, the second outgoing planar surface having first and second exit areas; an intermediate transparent layer interposed between the first outgoing and the second incident planar surfaces; a band-pass layer interposed between the intermediate transparent layer and the second incident planar surface and formed on the subsidiary incident area with the first outgoing and the second incident planar surfaces kept in substantially parallel to each other and with the incident light beam directed towards the subsidiary incident area through the intermediate transparent layer, the band-pass layer supplied with the incident light beam for passing the first outgoing light beam towards the first exit area and for reflecting the second outgoing light beam towards the primary reflection layer to make the primary reflection layer reflect the second outgoing light beam towards the second exit area through the remaining area; first and second subsidiary reflection layers interposed between the intermediate transparent layer and the second incident planar surface and formed on the first and the second subsidiary reflection areas, respectively, with said frist outgoing and said second incident planar surfaces kept in substantially parallel to each other; and first and second semitransparent layers formed on the first and the second exit areas and supplied with the first and the second outgoing light beams for partially passing the first and the second outgoing light beams, respectively, and for partially reflecting the first and the second outgoing light beams towards the first and the second subsidiary reflection layers to make the first and the second subsidiary reflection layers reflect the first and the second outgoing light beams towards the first and the second semitransparent layers, respectively. Each of the first and the second semitransparent layers thereby produces the plurality of the partial light beams for each of the first and the second outgoing light beams.

Another beam splitter to which this invention is also applicable is supplied with a single incident light beam having first, second, and other wavelength components for splitting the incident light beam into first and second outgoing light beams having the first and the second wavelength components, respectively, and for splitting each of the first and the second outgoing light beams into a plurality of partial light beams.

In this event, the beam splitter comprises: a first transparent block having first incident and first outgoing planar surfaces substantially parallel to each other, the first incident planar surface having a primary incident area and a primary reflection area, the primary incident area being for receiving the incident light beam to direct the incident light beam towards the first outgoing planar surface; a primary reflection layer formed on the primary reflection area; a second transparent block having second incident and second outgoing planar surfaces substantially parallel to each other, the second incident planar surface having first and second subsidiary incident areas and first and second subsidiary reflection areas, the second outgoing planar surface having first and second exit areas; an intermediate transparent layer interposed between the first outgoing and the second incident planar surfaces; a first band-pass layer interposed between the intermediate transparent layer and the second incident planar surface and formed on the first subsidiary incident area with the first outgoing and the second incident planar surfaces kept in sub tantially parallel to each other and with the inciden ht beam directed towards the first subsidiary incident area through the intermediate transparent layer, the first band-pass layer supplied with the incident light beam for passing the first outgoing light beam towards the first exit area and for reflecting the incident light beam except the first outgoing light beam as a reflected light beam towards the primary reflection layer to make the primary reflection layer reflect the reflected light beam towards the second subsidiary incident area through the intermediate layer; a second band-pass layer interposed between the intermediate transparent layer and the second incident planar surface and formed on the second subsidiary incident area with the first outgoing and the second incident planar surfaces kept in substantially parallel to each other, the second band-pass layer supplied with the reflected light beam for passing the second outgoing light beam towards the second exit area; first and second subsidiary reflection layers interposed between the intermediate transparent layer and the second incident planar surface and formed on the first and the second subsidiary reflection areas, respectively, with the first outgoing and the second incident planar surfaces kept in substantially parallel to each other; and first and second semitransparent layers formed on the first and the second exit areas and supplied with the first and the second outgoing light beams for partially passing the first and the second outgoing light beams, respectively, and for partially reflecting the first and the second outgoing light beams towards the first and the second subsidiary reflection layers to make the first and the second subsidiary reflection layers reflect the first and the second outgoing light beams towards the first and the second semitransparent layers, respectively. Each of the first and the second semitransparent layers thereby produces the plurality of the partial light beams for each of the first and the second outgoing light beams.

DESCRIPTION OF THE PREFERRED EMBODIMENTS

Figure 1:
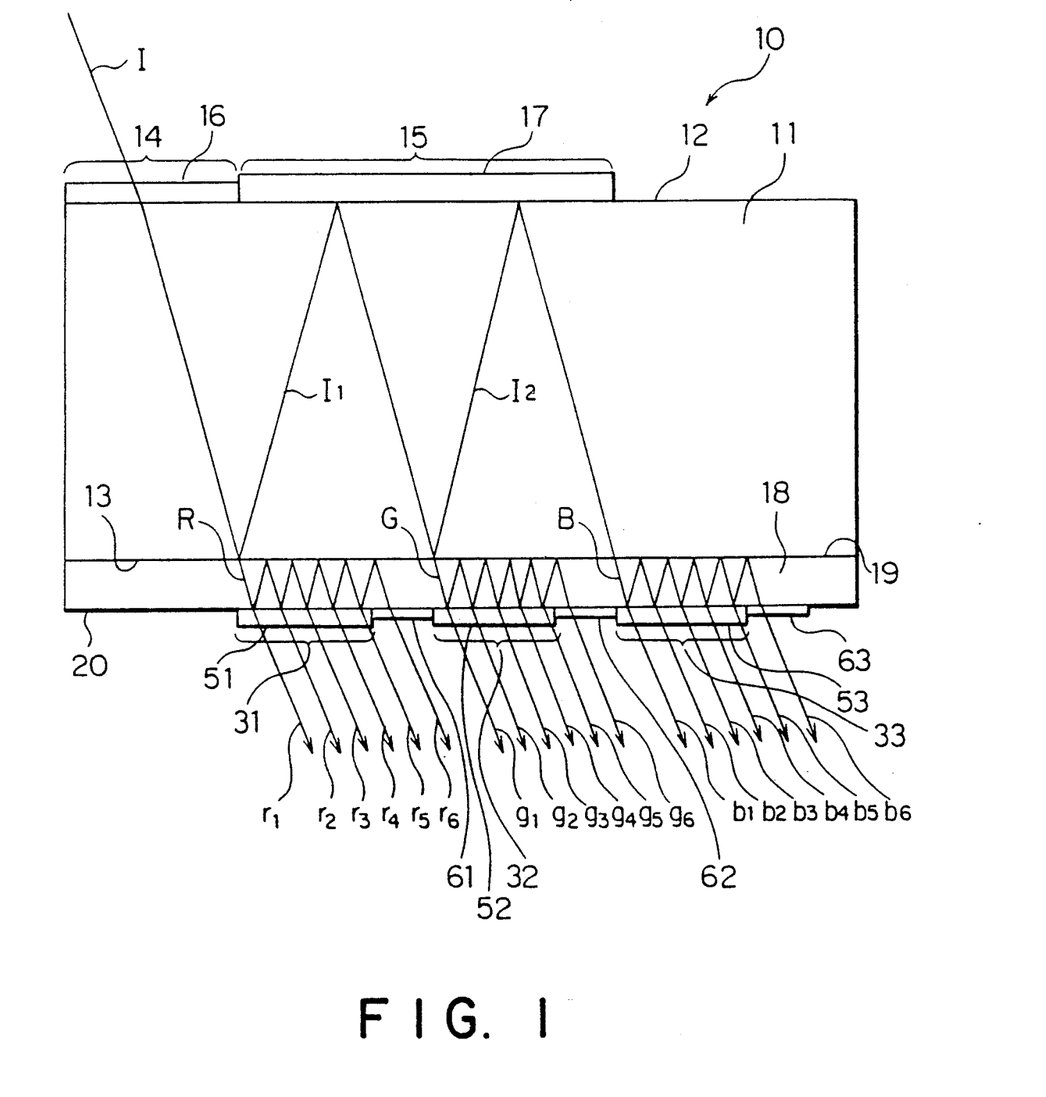
FIG. 1 is a schematic view of a beam splitter according to a first embodiment of this invention.

Referring to FIG. 1, a beam splitter 10 according to a first embodiment of this invention is supplied with a single incident laser beam I having first, second, and third wavelength components which correspond to red, green, and blue, respectively, in the illustrated example. The first through the third wavelength components are typically 636 nm, 535 nm, and 442 nm, respectively. The beam splitter 10 is for splitting the incident light beam I into first, second, and third outgoing light beams R, G, and B having the first, the second, and the third wavelength components, respectively, and for splitting each of the first, the second, and the third outgoing light beams R, G, and B into a plurality of partial or splitted light beams. The partial light beams for the first outgoing light beams R are labelled r1 to r6. For the second outgoing light beams G, the partial light beams are labelled g1 to g6. For the third outgoing light beams B, the partial light beams are labelled b1 to b6.

The beam splitter 10 comprises a first transparent block 11 having a refractive index and first incident and first outgoing planar surfaces 12 and 13 substantially parallel to each other. The first transparent block 11 may be of BSC-7 manufactured and sold by Hoya Corporation. The first incident planar surface 12 has a primary incident area 14 and a primary reflection area 15. On the primary incident area 14, an antireflection layer 16 of, for example, magnesium fluoride (MgF$_2$) is formed by the use of vacuum evaporation. The antireflection layer 16 is for receiving the incident light beam I to direct the incident light beam I towards the first outgoing planar surface 13. A primary reflection layer 17 is a total reflection layer and is formed on the primary reflection area 15 by the use of vacuum evaporation. The primary reflection layer 17 comprises, for example, a stack of an aluminum (Al) film and a magnesium fluoride (MgF$_2$) film and an overcoating film of silicon dioxide (SiO$_2$) coated on the stack.

Figure 2:
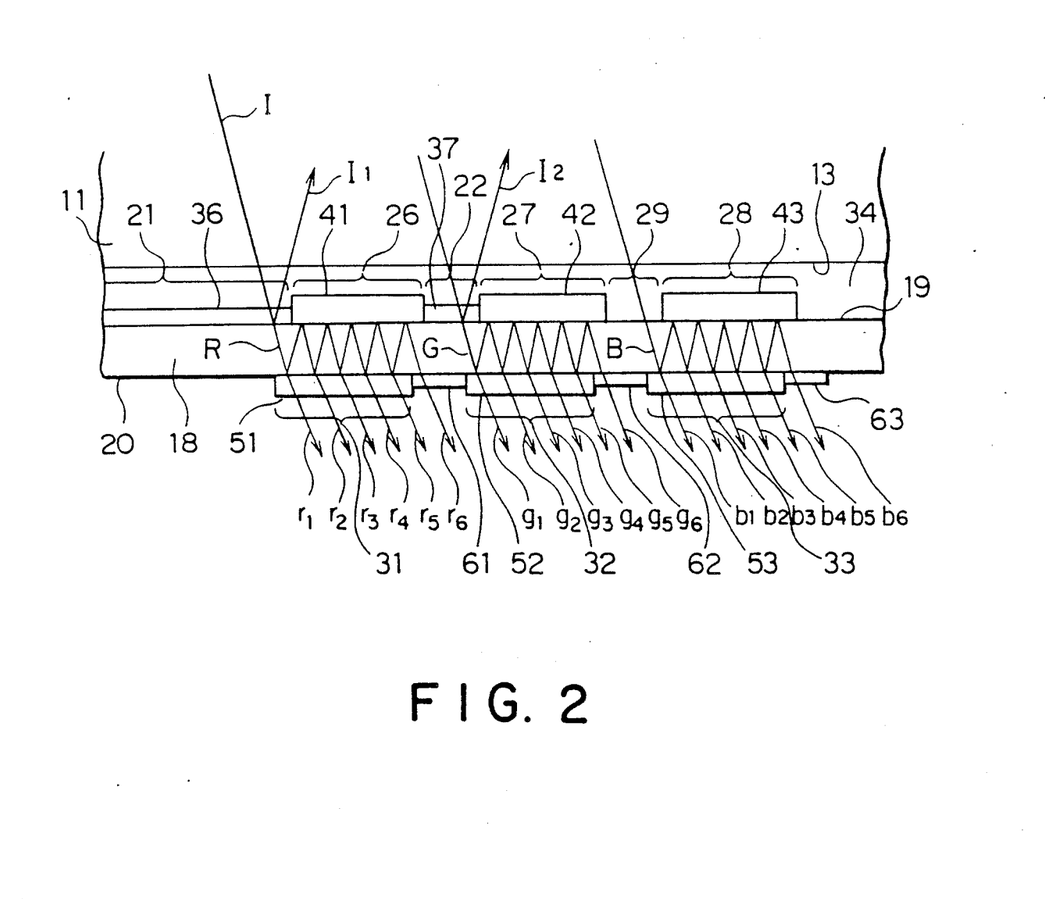
FIG. 2 is a partial enlarged schematic view of the beam splitter illustrated in FIG. 1.

Turning to FIG. 2, a second transparent block 18 has the refractive index and second incident and second outgoing planar surfaces 19 and 20 substantially parallel to each other. Like the first transparent block 11, the second transparent block 18 may also be of BSC-7 manufactured by Hoya Corporation. The second incident planar surface 19 has first and second subsidiary incident areas 21 and 22, first, second, and third secondary reflection areas 26 through 28, and a remaining area 29. The second outgoing planar surface 20 has first, second, and third exit areas 31 through 33.

An intermediate transparent layer 34 is an adhesive having the refractive index. The adhesive is, for example, an organic resin adhesive of THREE BOND MC3041. The intermediate transparent layer 34 is interposed between the first outgoing and the second incident planar surfaces 13 and 19.

Referring to FIGS. 1 and 2, a first band-pass layer 36 is interposed between the intermediate transparent layer 34 and the second incident planar surface 19 and formed on the first subsidiary incident area 21 with the first outgoing and the second incident planar surfaces 13 and 19 kept in substantially parallel to each other and with the incident light beam I directed towards the first subsidiary incident area 21 through the intermediate transparent layer 34. Supplied with the incident light beam I, the first band-pass layer 36 passes the first outgoing light beam R towards the first exit area 31 and reflects the incident light beam I except the first outgoing light beam R as a first reflected light beam I1 towards the primary reflection layer 17 to make the primary reflection layer 17 reflect the first reflected light beam I1 towards the second subsidiary incident area 22 through the intermediate layer 34. It should be noted here that the incident light beam I except the first outgoing light beam R is equivalent to a combination of the second and the third outgoing light beams G and B and that the first reflected light beam I1 is therefore equivalent to the combination of the second and third outgoing light beams G and B.

The first band-pass layer 36 may be of a dichroic film consisting of a stack of first through nineteenth films successively deposited on the second incident planar surface 19 by the use of vacuum evaporation. The first film is a titanium dioxide (TiO$_2$) film which has a thickness of $\lambda/8$ and is deposited on the first subsidiary incident area 26 of the second incident planar surface 19. Each of the second, the fourth, the sixth, the eighth, the tenth, the twelfth, the fourteenth, the sixteenth, and the eighteenth films is a silicon dioxide (SiO$_2$) film having a thickness of $\lambda/4$. The nineteenth film is a titanium dioxide film having a thickness of $\lambda/8$. Each of remaining films is a titanium dioxide film having a thickness of $\lambda/4$. In this case, $\lambda$ represents a wavelength equal to 490 nm. When the incident light beam I is a white-light or daylight beam, the first band-pass layer 36 typically passes a light beam of a wavelength band not less than 570 nm and typically reflects another light beam having another wavelength band which is not greater than 550 nm.

A second band-pass layer 37 is interposed between the intermediate transparent layer 34 and the second incident planar surface 19 and formed on the second subsidiary incident area 22 with the first outgoing and the second incident planar surfaces 13 and 19 kept in substantially parallel to each other. Supplied with the first reflected light beam I1 (namely, the combination of the second and the third outgoing light beams G and B), the second band-pass layer 37 passes the second outgoing light beam G towards the second exit area 32 and reflects the first reflected light I1 except the second outgoing light beam G as a second reflected light beam I2 towards the primary reflection layer 17 to make the primary reflection layer 17 reflect the second reflected light beam I2 towards the third exit area 33 through the remaining area 29. It should be noted here that the first reflected light beam I1 except the second outgoing light beam G is equivalent to the third outgoing light beams B and that the second reflected light beam I2 is therefore equivalent to the third outgoing light beam B.

Like the first band-pass layer 36, the second band-pass layer 37 may be of a dichroic film consisting of a stack of first through nineteenth films which are successively deposited by the use of vacuum evaporation. With the second band-pass layer 37, each of the first through the nineteenth films has a thickness determined on the supposition that the wavelength $\lambda$ is equal to 400 nm. When the incident light beam I is the white-light beam, the second band-pass layer 37 typically passes a light beam of a wavelength band greater than 460 nm and typically reflects another light beam of another wavelength band between 380 nm and 460 nm, both inclusive.

First, second, and third subsidiary reflection layers 41, 42, and 43 are interposed between the intermediate transparent layer 34 and the second incident planar surface 19 and formed on the first through the third subsidiary reflection areas 26, 27, and 28 by the use of vacuum evaporation, respectively. Like the primary reflection layer 17, each of the secondary reflection layers 41 to 43 is a total reflection layer and comprises, for example, a stack of an aluminum film and a magnesium fluoride film.

First, second, and third semitransparent layers 51, 52, and 53 are formed on the first through the third exit areas 31 to 33, respectively. Supplied with the first through the third outgoing light beams R, G, and B, the first through the third semitransparent layers 51 to 53 partially pass the first through the third outgoing light beams R, G, and B, respectively, and partially reflect the first through the third outgoing light beams R, G, and B towards the first through the third subsidiary reflection layers 41 to 43 to make the first through the third subsidiary reflection layers 41 to 43 reflect the first through the third outgoing light beams R, G, and B towards the first through the third semitransparent layers 51 to 53, respectively.

The first semitransparent layer 51 thereby produces the plurality of the partial or splitted light beams r1 to r5 for the first outgoing light beam R that have the same wavelength component (namely, the first wavelength component) in common as the first outgoing light beam R has. For the second outgoing light beam G, the second semitransparent layer 52, produces the plurality of the partial or splitted light beams g1 to g5 which have the second wavelength component in common. Likewise, the third semitransparent layer 53 produces, for the third outgoing light beam B, the plurality of the partial or splitted light beams b1 to b5 which have the third wavelength component in common. The partial light beams r1 to r5, g1 to g5, and b1 to b5 are substantially parallel to one another.

In the illustrated example, the first through the third semitransparent layers 51 to 53 are formed on the second outgoing planar surface 20 with a distance left between two adjacent ones of the first through the third semitransparent layers 51 to 53. First, second, and third antireflection layers 61, 62, and 63 are similar to the antireflection layer 16 and are formed on the second outgoing planar surface 20 by the use of vacuum evaporation with the first through the third antireflection layers 61 to 63 alternated with the first through the third semitransparent layers 51 to 53. The first through the third antireflection layers 61 to 63 produces, in cooperation with the first through the third semitransparent layers 51 to 53 and with the first through the third subsidiary reflection layers 41 to 43, the partial or splitted light beams r6, g6, and b6, respectively, which are substantially parallel to one another and to the partial light beams r1 to r5, g1 to g5, and b1 to b5. The partial or splitted light beams r6, g6, and b6 have the first through the third wavelength components, respectively.

Each of the first semitransparent layers 51 to 53 may be a stack of first through seventh films successively deposited on the second outgoing surface 20 by the use of vacuum evaporation.

With the first semitransparent layer 51, the first film is a titanium dioxide ($TiO_2$) film deposited on the second outgoing planar surface 20. Each of the second and the fourth films is a silicon dioxide ($SiO_2$) film. Each of the third and the fifth films is the titanium dioxide film. The sixth film is a magnesium fluoride ($MgF_2$) film. The seventh film is a zirconium dioxide ($ZrO_2$) film. With the first semitransparent layer 51, each of the first through the seventh films has a thickness of $\lambda/4$, where $\lambda$ represents a wavelength equal to 636 nm. The first semitransparent layer 51 has a reflectance between 80% and 85%, both inclusive, for the wavelength $\lambda$ of 636 nm.

The second semitransparent layer 52 is similar to the first semitransparent layer 51 except that the sixth film is the silicon dioxide film. With the second semitransparent layer 52, each of the first through the seventh films has a thickness of $\lambda/4$, where $\lambda$ represents another wavelength equal to 535 nm. The second semitransparent layer 52 has another reflectance between 80% and 85%, both inclusive, for the wavelength $\lambda$ of 535 nm.

The third semitransparent layer 53 is similar to the second semitransparent layer 52 except that the fifth film is the zirconium dioxide film. With the third semitransparent layer 53, each of the first through the seventh films has a thickness of $\lambda/4$, where $\lambda$ represents still another wavelength equal to 442 nm. The third semitransparent layer 53 has still another reflectance between 80% and 81%, both inclusive, for the wavelength $\lambda$ of 442 nm.

Each of the films for the band-pass layers, the primary and the subsidiary reflection layers, and the semitransparent layers may be of a dielectric material selected from a group of $Al_2O_3$, $Ta_2O_5$, $CeF_2$, $Y_2O_3$, and $HfO_2$.

In FIGS. 1 and 2, a combination of the third subsidiary reflection layer 43, the third semitransparent layer 53, and the third antireflection layer 63 becomes unnecessary when the incident light beam I has not the third wavelength component corresponding to the blue but has the first and the second wavelength components and other components which are different to the first through the third wavelength components. When the incident light beam I has only the first and the second wavelength components, the second band-pass layer 37 furthermore becomes unnecessary.

When the incident light beam I has not only the first through the third wavelength components but also the above-mentioned other components, a third band-pass layer similar in structure to the second band-pass layer 42 may be formed on the remaining area 29 with the third band-pass layer interposed between the intermediate transparent layer 34 and the second incident planar surface 19. Supplied with the second reflected light beam I2 having the third and the above-mentioned other wavelength components, the third band-pass layer passes the third outgoing light beam B towards the third exit area 33.

The beam splitter 10 illustrated in FIG. 1 can convert the incident light beam I into the splitted light beams r1 to r6, g1 to g6, and b1 to b6 without a large optical energy loss. This is because the intermediate transparent layer 34 has the refractive index substantially equal to those of the first and the second transparent blocks 11 and 18.

Figure 3:
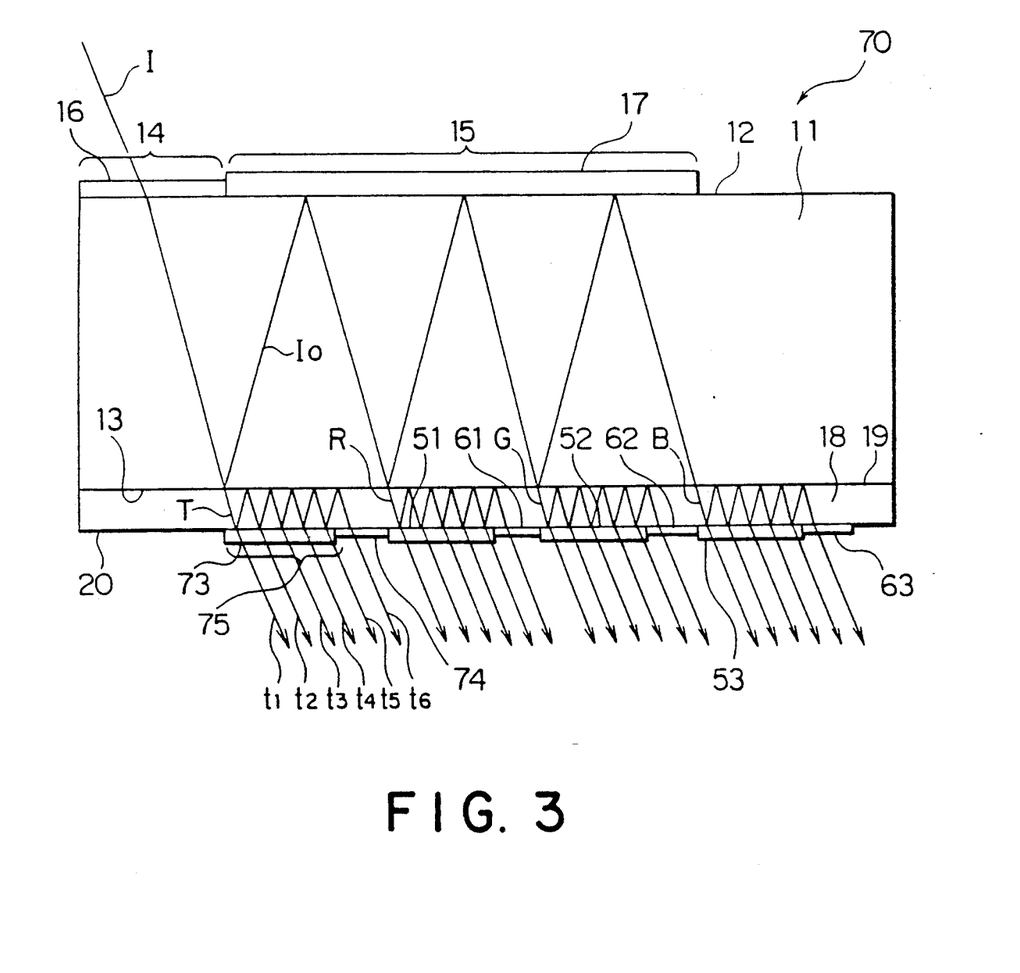
FIG. 3 is a schematic view of a beam splitter according to a second embodiment of this invention.
Figure 4:
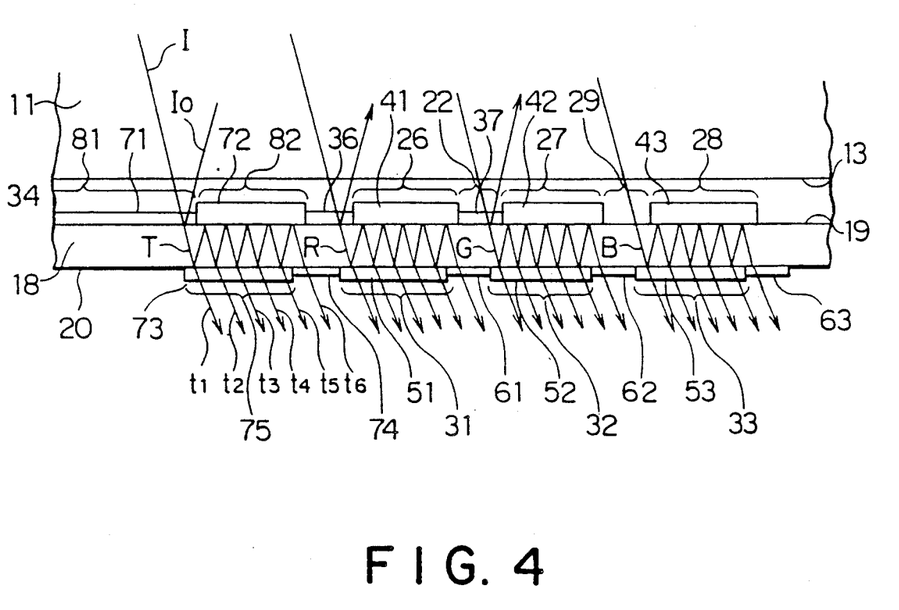
FIG. 4 is a partial enlarged schematic view of the beam splitter illustrated in FIG. 3.

Turning to FIGS. 3 and 4, a beam splitter 70 according to a second embodiment of this invention comprises similar parts designated by like reference numerals. The beam splitter 70 is supplied with the incident light beam I which further has a zeroth wavelength component different from the first through the third wavelength components. The zeroth wavelength component is typically 830 nm. The beam splitter 70 is for furthermore producing a zeroth outgoing light beam T having the zeroth wavelength component and for splitting the zeroth outgoing light beam T into a plurality of partial or splitted light beams labelled t1 to t6.

For this purpose, the beam splitter 70 further comprises a zeroth band-pass layer 71, a zeroth subsidiary reflection layer 72, a zeroth semitransparent layer 73, and a zeroth antireflection layer 74.

The zeroth band-pass layer 71 is formed on a zeroth subsidiary incident area 81 of the second incident planar surface 19. Supplied with the incident light beam I, the zeroth band-pass layer 71 passes the zeroth outgoing light beam T towards a zeroth exit area 75 of the second outgoing planar surface 20 and reflects the incident light beam I except the zeroth outgoing light beam T as a zeroth reflected light beam I0 towards the primary reflection layer 17 to make the primary reflection layer 17 reflect the zeroth reflected light beam I0 towards the first band-pass layer 36 through the intermediate layer 34 as the incident light beam of the first band-pass layer 36.

The zeroth band-pass filter 71 may also be of a dichroic film which typically passes a light beam of a wavelength band not less than 800 nm and typically reflects another light beam having another wavelength band which is not greater than 780 nm.

The zeroth subsidiary reflection layer 72 is formed on a zeroth subsidiary reflection area 82 of the second incident planar surface 19.

• Formed on the zeroth exit area 75 and supplied with the zeroth outgoing light beam T, the zeroth semitransparent layer 73 partially passes the zeroth outgoing light beam T and partially reflect the zeroth outgoing light beam T towards the zeroth subsidiary reflection layer 72 to make the zeroth subsidiary reflection layer 72 reflect the zeroth outgoing light beam T towards the zeroth semitransparent layer 73. In cooperation with the zeroth subsidiary reflection layer 72 and the zeroth antireflection layer 74 formed on the second outgoing planar surface 20, the zeroth semitransparent layer 73 produces the partial or splitted light beams t1 to t6 in the manner similar to a case where the first semitransparent layer 51 produces the partial beams r1 to r6 (FIGS. 1 and 2).

While this invention has thus far been described in conjunction with a few embodiments thereof, it will readily be possible for those skilled in the art to put this invention into practice in various other manners. For example, when the incident light beam I has other components different from the zeroth through the third wavelength components in the beam splitter illustrated in FIG. 4, the third band-pass layer may be formed on the remaining area 29 in the manner described in conjunction with FIGS. 1 and 2. In this event, the beam splitter may comprise an increased number K of a combination of the band pass layer, the subsidiary reflection layer, and the semitransparent layer when the incident light beam I has an increased number K of wavelength components, where K represents a positive integer greater than four.

What is claimed is:

1. A beam splitter supplied with a single incident light beam having first and second wavelength components for splitting said incident light beam into first and second outgoing light beams having said first and said second wavelength components, respectively, and for splitting each of said first and said second outgoing light beams into a plurality of partial light beams, said beam splitter comprising:

a first transparent block having first incident and first outgoing planar surfaces substantially parallel to each other, said first incident planar surface having a primary incident area and a primary reflection area, said primary incident area being for receiving said incident light beam to direct said incident light beam towards said first outgoing planar surface;

a primary reflection layer formed on said primary reflection area;

a second transparent block having second incident and second outgoing planar surfaces substantially parallel to each other, said second incident planar surface having a subsidiary incident area, first and second subsidiary reflection areas, and a remaining area, said second outgoing planar surface having first and second exit areas;

an intermediate transparent layer interposed between said first outgoing and said second incident planar surfaces;

a band-pass layer interposed between said intermediate transparent layer and said second incident planar surface and formed on said subsidiary incident area with said first outgoing and said second incident planar surfaces kept in substantially parallel to each other and with said incident light beam directed towards said subsidiary incident area through said intermediate transparent layer, said band-pass layer supplied with said incident light beam for passing said first outgoing light beam towards said first exit area and for reflecting said second outgoing light beam towards said primary reflection layer to make said primary reflection layer reflect said second outgoing light beam towards said second exit area through said remaining area;

first and second subsidiary reflection layers interposed between said intermediate transparent layer and said second incident planar surface and formed on said first and said second subsidiary reflection areas, respectively, with said first outgoing and said second incident planar surfaces kept in substantially parallel to each other; and first and second semitransparent layers formed on said first and said second exit areas and supplied with said first and said second outgoing light beams for partially passing said first and said second outgoing +light beams, respectively, and for partially reflecting said first and said second outgoing light beams towards said first and said second subsidiary reflection layers to make said first and said second subsidiary reflection layers reflect said first and said second outgoing light beams towards said first and said second semitransparent layers, respectively, each of said first and said second semitransparent layers thereby producing said plurality of the partial light beams for each of said first and said second outgoing light beams.

2. A beam splitter as claimed in claim 1, wherein said first and said second transparent blocks and said intermediate transparent layer have refractive indexes which are substantially equal to one another.

3. A beam splitter supplied with a single incident light beam having first, second, and other wavelength components for splitting said incident light beam into first and second outgoing light beams having said first and said second wavelength components, respectively, and for splitting each of said first and said second outgoing light beams into a plurality of partial light beams, said beam splitter comprising:

a first transparent block having first incident and first outgoing planar surfaces substantially parallel to each other, said first incident planar surface having a primary incident area and a primary reflection area, said primary incident area being for receiving said incident light beam to direct said incident light beam towards said first outgoing planar surface;

a primary reflection layer formed on said primary reflection area;

a second transparent block having second incident and second outgoing planar surfaces substantially parallel to each other, said second incident planar surface having first and second subsidiary incident areas and first and second subsidiary reflection areas, said second outgoing planar surface having first and second exit areas;

an intermediate transparent layer interposed between said first outgoing and said second incident planar surfaces;

a first band-pass layer interposed between said intermediate transparent layer and said second incident planar surface and formed on said first subsidiary incident area with said first outgoing and said second incident planar surfaces kept in substantially parallel to each other and with said incident light beam directed towards said first subsidiary incident area through said intermediate transparent layer, said first band-pass layer supplied with said incident light beam for passing said first outgoing light beam towards said first exit area and for reflecting the incident light beam except said first outgoing light beam as a reflected light beam towards said primary reflection layer to make said primary reflection layer reflect said reflected light beam towards said second subsidiary incident area through said intermediate transparent layer;

a second band-pass layer interposed between said intermediate transparent layer and said second incident planar surface and formed on said second subsidiary incident area with said first outgoing and said second incident planar surfaces kept in substantially parallel to each other, said second band-pass layer supplied with said reflected light beam for passing said second outgoing light beam towards said second exit area;

first and second subsidiary reflection layers interposed between said intermediate transparent layer and said second incident planar surface and formed on said first and said second subsidiary reflection areas, respectively, with said first outgoing and said second incident planar surfaces kept in substantially parallel to each other; and first and second semitransparent layers formed on said first and said second exit areas and supplied with said first and said second outgoing light beams for partially passing said first and said second outgoing light beams, respectively, and for partially reflecting said first and said second outgoing light beams towards said first and said second subsidiary reflection layers to make said first and said second subsidiary reflection layers reflect said first and said second outgoing light beams towards said first and said second semitransparent layers, respectively, each of said first and said second semitransparent layers thereby producing said plurality of the partial light beams for each of said first and said second outgoing light beams.

4. A beam splitter as claimed in claim 3, wherein said intermediate transparent layer has a refractive index which is substantially equal to that of said first transparent block.

5. A beam splitter supplied with a single incident light beam having first, second, and third wavelength components for splitting said incident light beam into first, second, and third outgoing light beams having said first, said second, and said third wavelength components, respectively, and for splitting each of said first through said third outgoing light beams into a plurality of partial light beams, said beam splitter comprising:

a first transparent block having first incident and first outgoing planar surfaces substantially parallel to each other, said first incident planar surface having a primary incident area and a primary reflection area, said primary incident area being for receiving said incident light beam to direct said incident light beam towards said first outgoing planar surface;

a primary reflection layer formed on said primary reflection area;

a second transparent block having second incident and second outgoing planar surfaces substantially parallel to each other, said second incident planar surface having first and second subsidiary incident areas, first, second, and third subsidiary reflection areas, and a remaining area, said second outgoing planar surface having first, second, and third exit areas;

an intermediate transparent layer interposed between said first outgoing and said second incident planar surfaces;

a first band-pass layer interposed between said intermediate transparent layer and said second incident planar surface and formed on said first subsidiary incident area with said first outgoing and said second incident planar surfaces kept in substantially parallel to each other and with said incident light beam directed towards said first subsidiary incident area through said intermediate transparent layer, said first band-pass layer supplied with said incident light beam for passing said first outgoing light beam towards said first exit area and for reflecting said second and said third outgoing light beams towards said primary reflection layer to make said primary reflection layer reflect said second and said third outgoing light beams towards said second incident area through said intermediate transparent layer;

a second band-pass layer interposed between said intermediate transparent layer and said second incident planar surface and formed on said second subsidiary incident area with said first outgoing and said second incident planar surfaces kept in substantially parallel to each other, said second band-pass layer supplied with said second and said third outgoing light beams for passing said second outgoing light beam towards said second exit area and for reflecting said third outgoing light beam towards said primary reflection layer to make said primary reflection layer reflect said third outgoing light beam towards said third exit area through said remaining area;

first, second, and third subsidiary reflection layers interposed between said intermediate transparent layer and said second incident planar surface and formed on said first through said third subsidiary reflection areas, respectively, with said first outgoing and said second incident planar surfaces kept in substantially parallel to each other; and first, second, and third semitransparent layers formed on said first through said third exit areas and supplied with said first through said third outgoing light beams for partially passing said first through said third outgoing light beams, respectively, and for partially reflecting said first through said third outgoing light beams towards said first through said third subsidiary reflection layers to make said first through said third subsidiary reflection layers reflect said first through said third outgoing light beams towards said first through said third semitransparent layers, respectively, each of said first through said third semitransparent layers thereby producing said plurality of the partial light beams for each of said first through said third outgoing light beams.

6. A beam splitter as claimed in claim 5, wherein said first and said second transparent blocks and said intermediate transparent layer have refractive indexes which are substantially equal to one another.

7. A beam splitter supplied with a single incident light beam having first, second, third, and other wavelength components for splitting said incident light beam into first, second, and third outgoing light beams having said first, said second, and said third wavelength components, respectively, and for splitting each of said first through said third outgoing light beams into a plurality of partial light beams, said beam splitter comprising:

a first transparent block having first incident and first outgoing planar surfaces substantially parallel to each other, said first incident planar surface having a primary incident area and a primary reflection area, said primary incident area being for receiving said incident light beam to direct said incident light beam towards said first outgoing planar surface;

a primary reflection layer formed on said primary reflection area;

a second transparent block having second incident and second outgoing planar surfaces substantially parallel to each other, said second incident planar surface having first, second, and third subsidiary incident areas and first, second, and third subsidiary reflection areas, said second outgoing planar surface having first, second, and third exit areas;

an intermediate transparent layer interposed between said first outgoing and said second incident planar surfaces;

a first band-pass layer interposed between said intermediate transparent layer and said second incident planar surface and formed on said first subsidiary incident area with said first outgoing and said second incident planar surfaces kept in substantially parallel to each other and with said incident light beam directed towards said first subsidiary incident area through said intermediate transparent layer, said first band-pass layer supplied with said incident light beam for passing said first outgoing light beam towards said first exit area and for reflecting the incident light beam except said first outgoing light beam as a first reflected light beam towards said primary reflection layer to make said primary reflection layer reflect said first reflected light beam towards said second subsidiary incident area through said intermediate transparent layer;

a second band-pass layer interposed between said intermediate transparent layer and said second incident planar surface and formed on said second subsidiary incident area with said first outgoing and said second incident planar surfaces kept in substantially parallel to each other, said second band-pass layer supplied with said first reflected light beam for passing said second outgoing light beam towards said second exit area and for reflecting the incident light beam except said first and said second outgoing light beams as a second reflected light beam towards said primary reflection layer to make said primary reflection layer reflect said second reflected light beam towards said third subsidiary incident area through said intermediate transparent layer;

a third band-pass layer interposed between said intermediate transparent layer and said second incident planar surface and formed on said third subsidiary incident area with said first outgoing and said second incident planar surfaces kept in substantially parallel to each other, said third band-pass layer supplied with said second reflected light beam for passing said third outgoing light beam towards said third exit area;

first, second, and third subsidiary reflection layers interposed between said intermediate transparent layer and said second incident planar surface and formed on said first through said third subsidiary reflection areas, respectively, with said first outgoing and said second incident planar surfaces kept in substantially parallel to each other; and first, second, and third semitransparent layers formed on said first through said third exit areas and supplied with said first through said third outgoing light beams for partially passing said first through said third outgoing light beams, respectively, and for partially reflecting said first through said third outgoing light beams towards said first through said third subsidiary reflection layers to make said first through said third subsidiary reflection layers reflect said first through said third outgoing light beams towards said first through said third semitransparent layers, respectively, each of said first through said third semitransparent layers thereby producing said plurality of the partial light beams for each of said first through said third outgoing light beams.

8. A beam splitter as claimed in claim 7, wherein said intermediate transparent layer has a refractive index which is substantially equal to that of said first transparent block.

9. A beam splitter supplied with a single original incident light beam having first, second, . . . , (N-1)-th, N-th, and other wavelength components for splitting said original incident light beam into first, second, . . . , (N-1)-th, and N-th outgoing light beams having said first through said N-th wavelength components, respectively, and for splitting each of said first through said N-th outgoing light beams into a plurality of partial light beams, where N represents an integer greater than three, said beam splitter comprising:

a first transparent block having first incident and first outgoing planar surfaces substantially parallel to each other, said first incident planar surface having a primary incident area and a primary reflection area, said primary incident area being for receiving said original incident light beam to direct said original incident light beam towards said first outgoing planar surface;

a primary reflection layer formed on said primary reflection area;

a second transparent block having second incident and second outgoing planar surfaces substantially parallel to each other, said second incident planar surface having first, second, . . . , (N-1)-th, and N-th subsidiary incident areas and first, second, . . . , (N-1)-th, and N-th subsidiary reflection areas, said second outgoing planar surface having first, second, . . . , (N-1)-th, and N-th exit areas;

an intermediate transparent layer interposed between said first outgoing and said second incident planar surfaces;

first, second, . . . , (N-1)-th, and N-th band-pass layers interposed between said intermediate transparent layer and said second incident planar surface and formed on said first through said N-th subsidiary incident areas, respectively, with said first outgoing and said second incident planar surfaces kept in substantially parallel to each other and with said original incident light beam directed towards said first subsidiary incident area through said intermediate layer, said first through said N-th band-pass layers supplied with first, second, . . . , (N-1)-th, and N-th incident light beams for passing said first through said N-th outgoing light beams towards said first through said N-th exit areas, respectively, said first through said (N-1)-th band-pass layers being for reflecting first through (N-1)-th reflected light beams towards said primary reflection layer to make said primary reflection layer reflect, as said second through said N-th incident light beams, said first through said (N-1)-th reflected light beams towards said second through said N-th exit areas through said intermediate transparent layer, respectively, said first incident light beam being equivalent to said original incident light beam, said second incident light beam being equivalent to the original incident light beam except said first outgoing light beam, said N-th incident light beam being equivalent to the original light beam except said first through said (N-1)-th outgoing light beams;

first, second, ..., (N-1)-th, and N-th subsidiary reflection layers interposed between said intermediate transparent layer and said second incident planar surface and formed on said first through said N-th subsidiary reflection areas, respectively, with said first outgoing and said second incident planar surfaces kept in substantially parallel to each other; and first, second, ..., (N-1)-th, and N-th semitransparent layers formed on said first through said N-th exit areas and supplied with said first through said N-th outgoing light beams for partially passing said first through said N-th outgoing light beams, respectively, and for partially reflecting said first through said N-th outgoing light beams towards said first through said N-th subsidiary reflection layers to make said first through said N-th subsidiary reflection layers reflect said first through said N-th outgoing light beams towards said first through said N-th semitransparent layers, respectively, each of said first through said N-th semitransparent layers thereby producing said plurality of the partial light beams for each of said first through said N-th outgoing light beams.

10. A beam splitter as claimed in claim 9, wherein said intermediate transparent layer has a refractive index which is substantially equal to that of said first transparent block.

* * * * *

UNITED STATES PATENT AND TRADEMARK OFFICE
CERTIFICATE OF CORRECTION

PATENT NO.   : 5,071,225
DATED        : December 10, 1991
INVENTOR(S)  : Teiji INOUE It is certified that error appears in the above-identified patent and that said Letters Patent is hereby corrected as shown below:

Title page, item
[30]      Japanese priority Application should read

"1-342437" instead of "63-342437"

Signed and Sealed this

Twentieth Day of April, 1993

Attest:

MICHAEL K. KIRK

*Attesting Officer*         *Acting Commissioner of Patents and Trademarks*